(12) United States Patent
Schmieder et al.

(10) Patent No.: US 8,266,637 B2
(45) Date of Patent: Sep. 11, 2012

(54) PRIVACY MODES IN A REMOTE DESKTOP ENVIRONMENT

(75) Inventors: Wilhelm R. Schmieder, Snoqualmie, WA (US); Jeson Patel, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 1227 days.

(21) Appl. No.: 12/041,595

(22) Filed: Mar. 3, 2008

(65) Prior Publication Data

US 2009/0222739 A1 Sep. 3, 2009

(51) Int. Cl.
G06F 3/00 (2006.01)
G06F 15/16 (2006.01)

(52) U.S. Cl. ............. 719/321; 709/204; 709/230; 710/5

(58) Field of Classification Search .................. None
See application file for complete search history.

(56) References Cited

U.S. PATENT DOCUMENTS

| | | | |
|---|---|---|---|
| 5,841,435 A * | 11/1998 | Dauerer et al. | 715/775 |
| 6,006,282 A * | 12/1999 | DeLeeuw et al. | 710/5 |
| 6,691,154 B1 * | 2/2004 | Zhu et al. | 709/204 |
| 6,973,482 B2 | 12/2005 | Mohammed et al. | |
| 2004/0145605 A1 | 7/2004 | Basu et al. | |
| 2005/0080915 A1 | 4/2005 | Shoemaker et al. | |
| 2005/0088452 A1 * | 4/2005 | Hanggie et al. | 345/581 |
| 2005/0120073 A1 * | 6/2005 | Cho | 709/201 |
| 2006/0069797 A1 | 3/2006 | Abdo et al. | |
| 2006/0085550 A1 * | 4/2006 | Schmieder et al. | 709/230 |
| 2006/0156285 A1 * | 7/2006 | Jensen et al. | 717/120 |
| 2006/0190532 A1 | 8/2006 | Chadalavada | |
| 2007/0055780 A1 | 3/2007 | Cartes et al. | |
| 2007/0080823 A1 * | 4/2007 | Fu et al. | 340/825.22 |
| 2007/0124474 A1 | 5/2007 | Margulis | |
| 2007/0192491 A1 | 8/2007 | Saigo et al. | |
| 2009/0228801 A1 * | 9/2009 | Lee et al. | 715/730 |

OTHER PUBLICATIONS

Cates, "Taking Advantage of the SAS System on Windows NT", available at least as early as Sep. 25, 2007, at <<http://www2.sas.com/proceedings/sugi22/SYSARCH/PAPER307.PDF>>, pp. 10.

McGovern, "Using Curt for Cursor and Keyboard Redirection in Multi-Display Environments", at <<http://orchid.cs.uiuc.edu/projects/curt/McGovernThesis.pdf>, Andrew McGovern, 2006, pp. 57.

Streitz, et al., "DOLPHIN: Integrated Meeting Support across LiveBoards, Local and Remote Desktop Environments", at <<http://citeseer.ist.psu.edu/cache/papers/cs/1796/ftp:zSzzSzftp.darmstadt.gmd.dezSzpubzSzconcertzSzpublicationszSzcscw94.pdf/streitz94dolphin.pdf>>, ACM, 1994, pp. 14.

* cited by examiner

Primary Examiner — Charles E Anya
Assistant Examiner — Tuan Dao
(74) Attorney, Agent, or Firm — Lee & Hayes, PLLC (57) ABSTRACT

Techniques described maintain privacy of a remote desktop client when the remote client interacts with and displays the desktop of the host device. The described techniques enable such privacy and control even when the host computing device does not run an operating system with session support. The host includes a virtual display driver, which is not associated with a physical display, and a physical display driver, which is associated with a physical display. The techniques associate the virtual display driver with a mirror driver of the host, while disassociating the physical display driver from the mirror driver. The mirror thus driver provides contents of the virtual display to the remote client. Additionally, because the virtual display driver is not associated with a physical display, the contents of the virtual display (and hence the interactions of the remote client) are not displayed at the host.

19 Claims, 6 Drawing Sheets

PRIVACY MODES IN A REMOTE DESKTOP ENVIRONMENT

BACKGROUND

Traditional remote desktop methods leverage operating systems having session support. These operating systems allow a remote client to access a host computing device without displaying the remoted desktop on a physical display of the host computing device. As such, these operating systems allow the remote client to access and control the host while maintaining privacy of the remote client. Additionally, these operating systems allow the remote client to control the remote desktop session, while disallowing users at the host to inject input into the session.

Recent developments in the remote desktop realm, however, allow a remote client to access a host computing device that does not include an operating system having session support. In these instances, the remote client receives a direct representation of the desktop of the host computing device. As such, the operations taken by and displayed on the remote client are also displayed on a physical display of the host computing device. Additionally, a user at the host computing device may interfere with the remote desktop connection by injecting input, such as keystrokes or mouse input, into the system.

SUMMARY

This document describes techniques for maintaining privacy of a remote client that accesses a host computing device, while still allowing the remote client to view and interact with the desktop of the host device. The described techniques enable such privacy and control even when the host computing device does not run an operating system with session support. In some instances, the host computing device includes a virtual display driver, which is not associated with a physical display of the host, and a physical display driver, which is associated with a physical display of the host. The techniques may associate the virtual display driver with a mirror driver of the host, while disassociating the physical display driver from the mirror driver. As such, the mirror driver provides contents of the virtual display to the remote client. Additionally, because the virtual display driver is not associated with a physical display of the host, the contents of the virtual display (and hence the interactions of the remote client) are not displayed at the host.

The host computing device may also block input received at a physical console of the host, while processing input received from the remote client. In combination, the described techniques thus allow a user of the remote client to interact with the host, while disallowing users at the host to view or interfere with these interactions.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), and/or computer-readable instructions as permitted by the context above and throughout the document.

BRIEF DESCRIPTION OF THE CONTENTS

The detailed description is described with reference to accompanying figures. In the figures, the left-most digit(s) of a reference number identifies the figure in which the reference number first appears. The use of the same reference numbers in different figures indicates similar or identical items.

DETAILED DESCRIPTION

The following discussion targets techniques for maintaining privacy of a remote client that accesses a host computing device, while still allowing the remote client to view and interact with the desktop of the host device. The described techniques enable such privacy and control even when the host computing device does not run an operating system with session support. The discussion also targets techniques to process input received from the remote client, while blocking input received from the host.

The discussion begins with a section entitled "Illustrative Remote Desktop Architecture", which describes an illustrative architecture which may employ the claimed techniques. A second section entitled "Establishing a Privacy Mode in a Remote Desktop Environment" follows. This section describes how the claimed techniques may establish a mode where the remote client views and interacts with a desktop of the host, while disallowing the display of such interactions at the host. A third and final section, entitled "Blocking Input and Restoring Control at the Host", follows. This section describes how the claimed techniques may block input received from the host. This section also describes how the techniques take down the privacy mode at the end of a remote desktop session in order to allow users of the host device to control and interact with the host.

This brief introduction, including section titles and corresponding summaries, is provided for the convenience of the reader and is not intended to limit the scope of the claims, nor the proceeding sections.

Illustrative Remote Desktop Architecture

Figure 1:
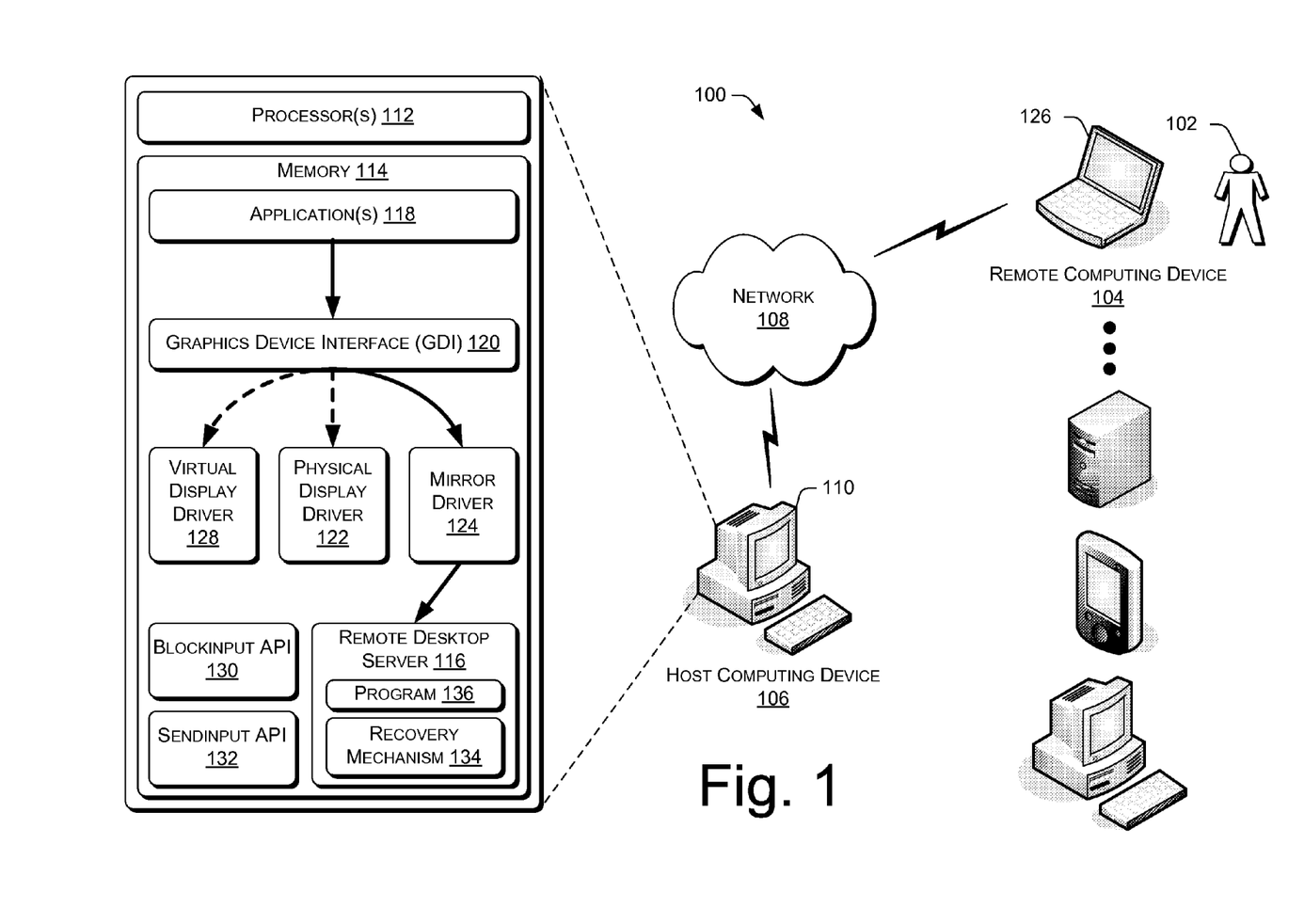
FIG. 1 depicts an illustrative remote desktop architecture in which a remote client may securely interact and view interactions with a host computing device, even in instances where the host runs an operating system without session support.

FIG. 1 illustrates an illustrative remote desktop architecture 100 that may employ the described privacy mode. While the claimed techniques are described with reference to architecture 100, it is specifically noted that multiple other architectures and environments may also employ these techniques. As illustrated, architecture 100 includes a user 102 operating a remote computing device 104 (also referred to as a "remote client") to access a host computing device 106 (also referred to as a "host device" or merely a "host") via a network 108. Network 108 may comprise the Internet, a Local Area Network (LAN), a Wide Area Network (WAN), a wireless network, and/or the like. While remote computing device 104 is illustrated as a laptop computer, this device may instead comprise, without limitation, a personal computer, a mobile phone, a personal digital assistant (PDA), a portable media player (PMP) (e.g., a portable video player (PVP) or a digital audio player (DAP)), and the like. FIG. 1 illustrates a few of these illustrative devices. Similarly, while FIG. 1 illustrates host 106 as a personal computer, the host may instead comprise any sort of computing device, such as those devices listed directly above.

As illustrated, host 106 may include a physical display 110, as well as one or more processors 112 and memory 114. Display 110 functions to display viewable images generated by processors 112 and/or memory 114. In the illustrated implementation, memory 114 includes a remote desktop server 116. Remote desktop server 116 comprises a piece of software installed on host 106 that enables a client, such as remote client 104, to access and remotely control host 106. In the illustrated implementation, host 106 runs an operating system (OS) that does not include session support. As such, remote desktop server 116 functions as an alternative to traditional OS-enabled remote desktop. Of course, in other implementations the OS may include session support.

As noted above, however, remote desktop server 116 may function to provide a direct representation of the physical desktop (or terminal) of host 106 to remote client 104. As such, without the described components of host 106, the contents provided to remote client 104 during a remote desktop session would also be displayed on host display 110. Additionally, input (e.g., keystrokes) that is injected at host 106 would be processed just as if the input were provided at remote client 104. The privacy mode described below, however, functions to eliminate this unsecured remote desktop scenario.

In addition to remote desktop server 116, memory 114 includes one or more applications 118. Applications 118 may include any traditional applications found on a computing device or otherwise, such as a word processing application, a drawing application, a web browser application, and the like. Memory 114 further includes a graphics device interface (GDI) 120. GDI 120 is an interface for representing graphical objects and transmitting them to output devices such as computer monitors (e.g., display 110), printers, and the like.

As FIG. 1 illustrates, applications 118 provide information to GDI 120, which then transmits this data to output devices. For instance, GDI 120 may transmit this information to a physical display driver 122, which is associated with host display 110. With this information, physical display driver 122 and host display 110 would render the information provided by applications 118. For instance, imagine that a user of host 106 were typing a document with use of one of applications 118. This application would then draw to GDI 120, which would in turn send this information to physical display driver 122 for rendering on host display 110. While the illustrated implementation is described with reference to GDI 120, other implementations may employ another interface that includes similar functionality.

Memory 114 also includes a mirror driver 124 for providing contents sent from GDI 120 and destined for the physical display driver (or whichever driver with which mirror driver 124 is associated with) to the remote desktop server 116. Remote desktop server 116 then provides these contents to remote client 104 for rendering on a display 126 of remote client 104. In other words, mirror driver 124 mirrors the information sent from GDI 120 and to a driver of host 106, such that remote desktop server 116 may provide this mirrored information to a client that remotely controls host 106.

In addition to physical display driver 122 and mirror driver 124, however, host 106 also includes a virtual display driver 128. Virtual display driver 128 is a driver loaded into memory 114 that is associated with a virtual (but non-physical) display. Because virtual display driver 128 is associated with a virtual rather than a physical display, any information sent from GDI 120 to virtual display driver 128 will not be rendered on display 110 of host 106. Nevertheless, any information sent from GDI 120 to virtual display driver 128 may be sent to mirror driver 124 and, as such, may be sent to remote client 104 for rendering on display 126.

As described in detail below with reference to FIGS. 2-4, virtual display driver 128 may thus, in conjunction with mirror driver 124, enable user 102 to interact with host 106 without such interactions being displayed on host display 110. As such, drivers 128 and 124 may allow user 102 to privately operate host computing device 106.

In addition to providing a private remote desktop environment for user 102, remote desktop server 116 may also include a program 136 to leverage functionality of host 106 to enable user 102 to inject input into host 106 from remote client 104, while blocking input injected at the host itself. As illustrated, host 106 may include a blockinput application program interface (API) 130, as well as a sendinput API 132 (e.g., stored on an operating system of host 106). While the illustrated implementation describes APIs 130 and 132, it is specifically noted that the described functionality may be accomplished with use of similar or different types of applications.

Figure 5:
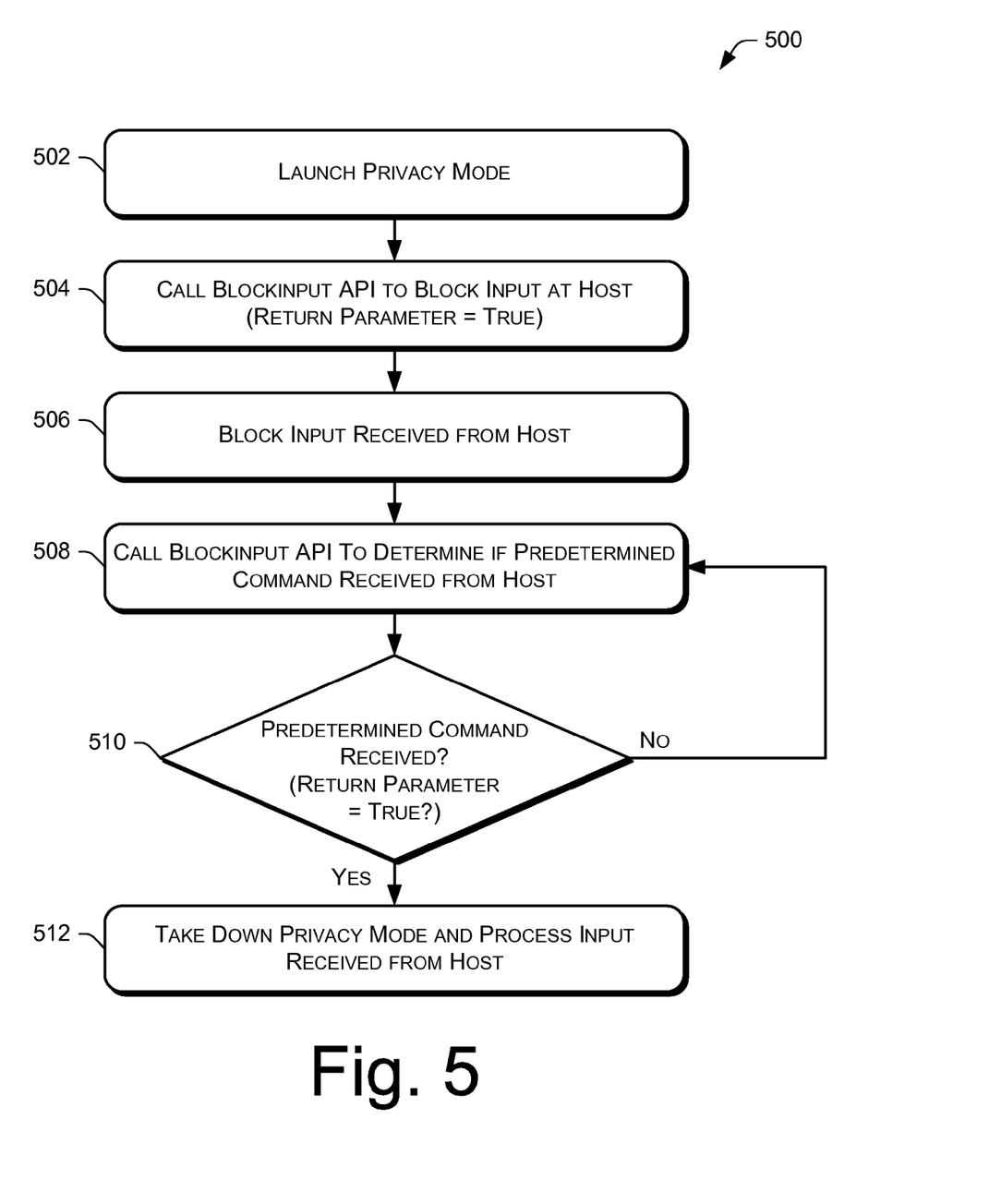
FIG. 5 depicts an illustrative process for blocking input received from a physical console of the host computing device of FIG. 1 when the privacy mode of FIGS. 2-4 is enabled. This process also illustrates unblocking the input and taking down the privacy mode in response to receiving a predetermined command from the host.

Blockinput API 130 functions to block most or all input received at host computing device 106 after remote client 104 initiates a remote desktop session with the host 106. In some instances, however, blockinput API 130 may allow a certain predetermined command sent from host 106 to pass through in order for a user of host 106 to regain control of the host during a remote desktop session. FIG. 5 and an accompanying discussion illustrate and describe an illustrative process for blocking host input (with use of blockinput API 130) as well as restoring control to host 106 in response to receiving the predetermined command.

Sendinput API 132, meanwhile, functions to enable user 102 to inject input into host 106 from remote client 104. Blockinput API 130 and sendinput API 132 thus allow remote client 104 to exclusively control host 106 until a predetermined command is received from the host computing device 106. Program 136 may detect the unblocking of the input via the predetermined command and may lock host 106 until a user logs on to the host. Additionally, and as described in detail below, the combination of virtual display driver 128 and APIs 130 and 132 thus allow for user 102 to conduct a secure and private remote desktop session between remote client 104 and host 106.

Finally, remote desktop server 116 includes a recovery mechanism 134. Recovery mechanism 134 functions to store one or more configurations of host 106 before remote client 104 initiates a remote desktop session with host 106. If host 106 crashes during the session, then recovery mechanism 134 accesses, upon reboot of the host, a stored configuration of the host prior to the initiation of the remote desktop session. Recovery mechanism 134 then restores this configuration such that host 106 is configured as it was prior to the remote desktop session.

Establishing a Privacy Mode in a Remote Desktop Environment

Figure 2:
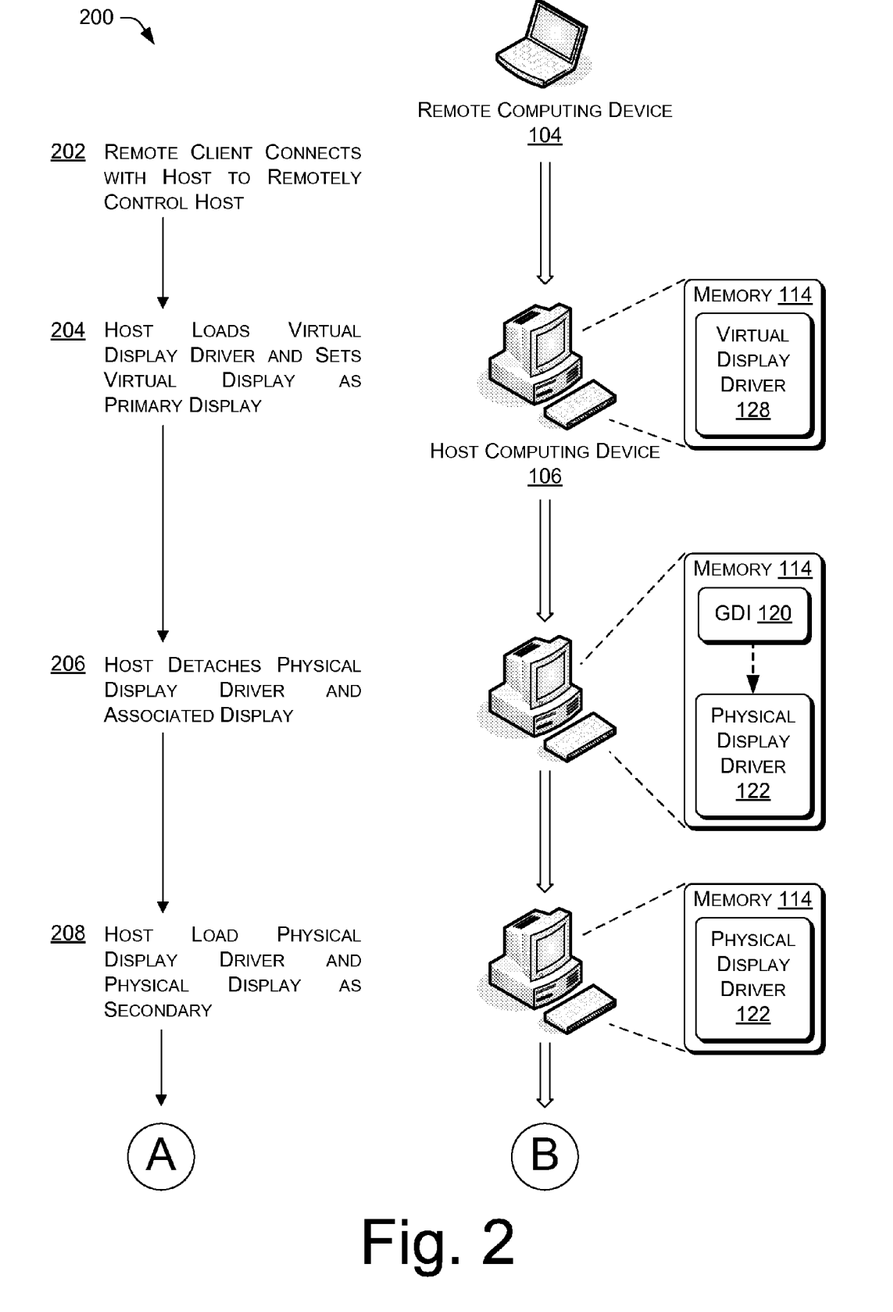
FIGS. 2-4 depict an illustrative process for establishing a privacy mode in the remote desktop architecture of FIG. 1. Once established, this privacy mode allows the remote client to display and interact with the desktop of the host, while not allowing the host to display the desktop.
Figure 3:
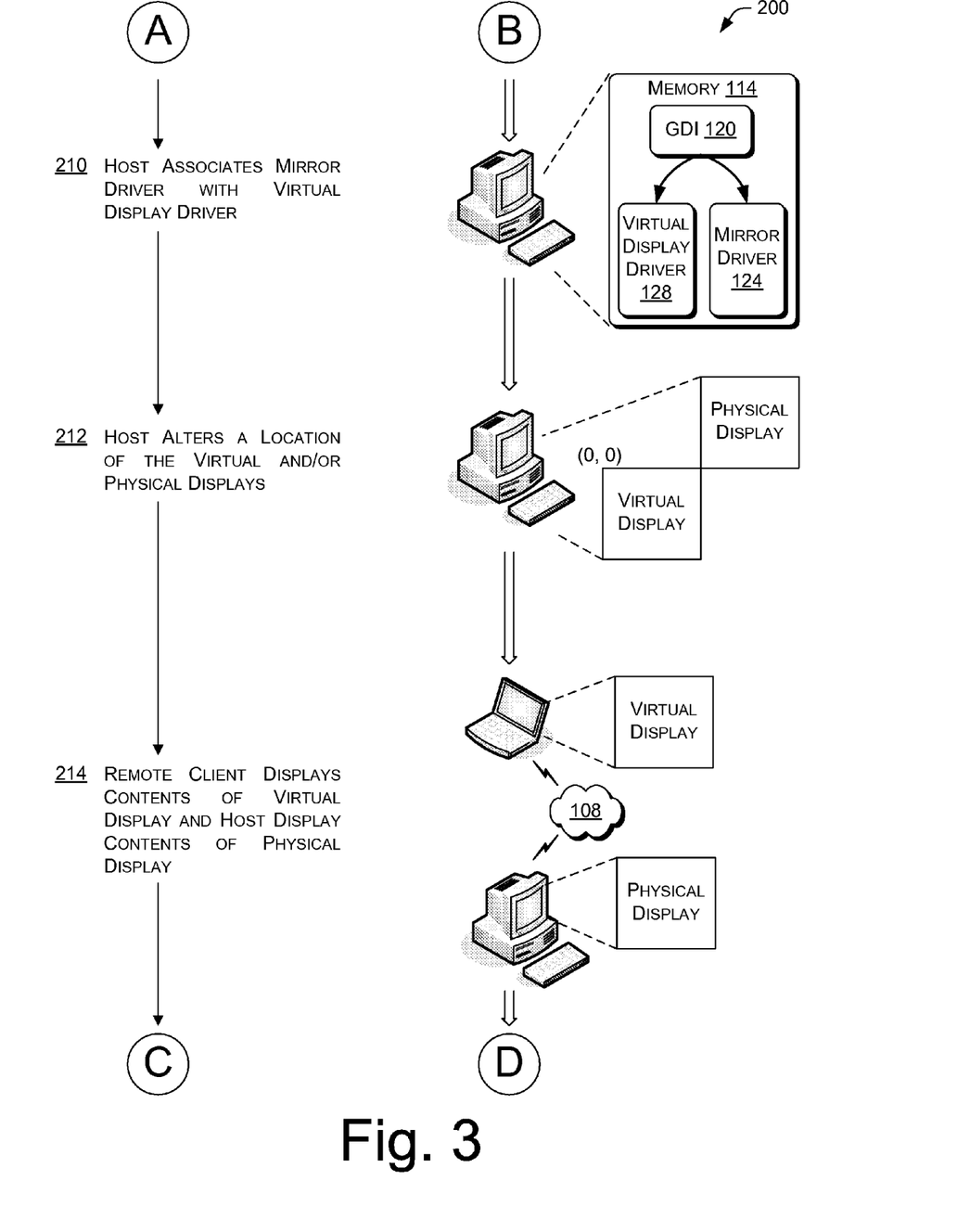
Figure 4:
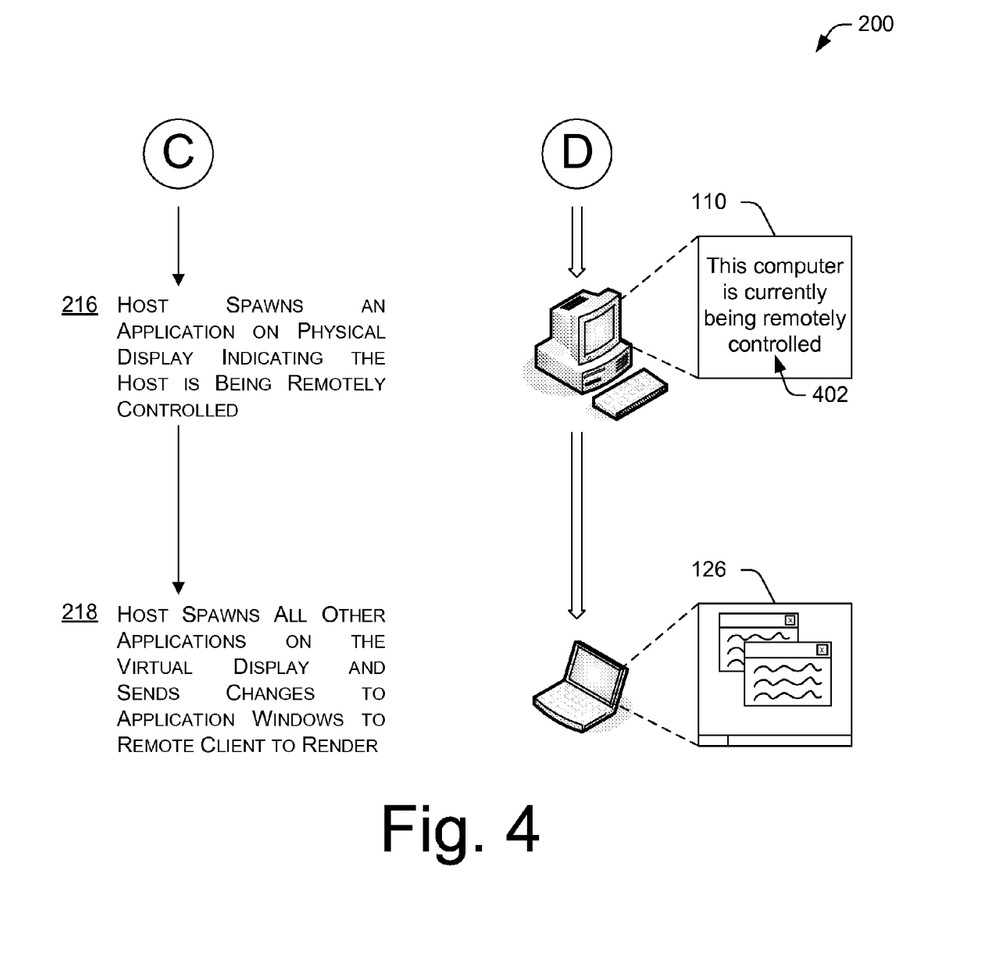

FIGS. 2-4 depict an illustrative process 200 for establishing a privacy mode in the remote desktop architecture of FIG. 1. Once established, this privacy mode allows remote client 104 to display and interact with the desktop of host 106, while not allowing host 106 to display the desktop. Process 200, as well as other processes described throughout, represents a sequence of operations that can be implemented in hardware, software, or a combination thereof. In the context of software, the operations represent computer instructions that, when executed by one or more processors, perform the recited operations. The order in which the operations are described is not intended to be construed as a limitation, and any number of the described operations can be combined in any order and/or in parallel to implement the process.

Process 200 includes operation 202, which represents remote client 104 connecting to host 106 in order to remotely control the host. That is, at operation 202 remote client 104 beings remotely controlling host 106 with use of remote desktop server 116. At operation 204, meanwhile, host computing device 106 loads virtual display driver 128 as a primary display of host 106. Operation 206 then represents that host 106 detaches or unloads physical display driver 122 and associated display 110. Operation 206 may similarly detach one or more other physical display drivers and associated displays in multi-monitor systems. At operation 208, host 106 then loads physical display driver 122 and associated display 110 as a secondary display. Conversely, as opposed to detaching physical display driver 122 and thereafter loading the driver, other implementations may instead programmatically move all open applications to the virtual display. Physical display driver 122 may then be associated as a secondary display.

By loading the virtual display as the primary display and the physical display of the host as the secondary display, applications opened by remote client 104 will spawn on the virtual display rather than the physical display. As such, these opened applications will not be displayed at the host computing device.

Process 200 continues on FIG. 3 at operation 210. Operation 210 represents that host 106 associates mirror driver 124 with virtual display driver 128. By associating mirror driver 124 with virtual display driver 128, mirror driver 124 provides contents of the virtual display to remote client 104. Again, contents of the virtual display (including spawned applications and the like) are therefore provided to remote client 104, while avoiding the display of these same contents on the physical display of the host.

Operation 212 then represents that host 106 alters a location of the physical display and/or a location of the virtual display such that these displays do not overlap. Because host 106 has loaded the virtual display as the primary display, host 106 only alters a location of the physical display in some implementations. Additionally, in some implementations, the physical display is moved such that the physical display is above the virtual display. In still further implementations, the physical display may be both above the virtual display and approximately diagonal to the virtual display. This latter configuration, which FIG. 3 illustrates, makes it difficult for user 102 operating remote client 104 to move an application window from the virtual display (whose contents are displayed at remote client 104 and not at host 106) to the physical display (whose contents are displayed at host 106 and not at remote client 104).

In more detail, many application windows enable users to move the windows by selecting a toolbar that typically appears at the top of the window. Therefore, if user 102 were to attempt to drag and drop an application window from the virtual display and onto the physical display when these displays were located in the manner illustrated by FIG. 3, only a relatively small portion of the window would appear on the physical display. Additionally, host 106 may attempt to obscure even this small portion of the application window within the border of the physical display, as discussed in detail below with reference to operation 216.

Next, operation 214 represents that remote client 104 displays the contents of the virtual display (which is attached to mirror driver 124), while display 110 of host 106 displays contents of the physical display. Conversely, because the physical display is not attached to mirror driver 124, contents of the physical display are not remoted to remote client 104. Similarly, because virtual display driver 128 is not associated with an actual physical display at host 106, contents of the virtual display are not displayed at host 106.

Continuing to FIG. 4, operation 216 represents that host 106 spawns an application on the physical display that indicates that host 106 is being remotely controlled. Here, FIG. 4 illustrates that the application displays a piece of text 402 on the physical display. Text 402 states: "This computer is currently being remotely controlled". Of course, other implementations may display different text, images, or the like, or may not display anything at all.

In addition to text 402 (or images or the like), the spawned application may obscure the contents of the display by displaying a black box or the like on host display 110 (in the form of the text, images, or the like). This displayed black box (that includes the text, images, or the like) may contain a property that specifies that the black box should always remain on top. Therefore, if user 102 were to move a portion of an application window from the virtual display onto the physical display, the black box would obscure that portion by moving to the front of the physical display. This "always on top" black box may therefore help to ensure that the interactions of user 102 on remote client 104 remain private and not displayed at host 106.

Finally, operation 218 represents that host 106 may spawn all or substantially all applications (other than the obscuring application from operation 216) on the virtual display. As such, these applications appear on display 126 of remote client 104, but are not displayed on display 110 of host 106. Additionally, if an application improperly spawns on the physical display, this application may be programmatically moved to the virtual display. Operation 218 also represents that changes made to application windows are sent to remote client 104 for rendering on display 126. For instance, if user 102 types a document while remote controlling host 106, the changes made to the document (as well as the document application itself) appear on display 126 but not on display 110.

Blocking Input and Restoring Control at the Host

Having described a process for providing visual privacy for remote client 104, FIG. 5 now depicts an illustrative process 500 for blocking input from a physical console of the host 106. This process also illustrates and describes unblocking the input and taking down the privacy mode in response to receiving a predetermined command at the host.

Process 500 includes operation 502, which represents launching a privacy mode, such as the privacy mode described above with reference to FIGS. 2-4. Next, operation 504 calls blockinput API 130 to block input received at the host computing device 106, which results in the return of a "true" parameter indicating that input will be blocked. Once called, blockinput API 130 blocks, at operation 506, all or substantially all input from users operating a physical console of host 106.

For instance, API 130 would block most or all keystrokes, mouse inputs, or other interactions by users controlling the physical console. In some instances, blockinput API 130 does not block a certain predetermined command that, when received, unblocks the blocking of the input and takes down the privacy mode. In some instances, this command comprises a secure attention sequence (SAS) received from a keyboard of host 106. This SAS may comprise a control-alt-delete key sequence, or some other predetermined key sequence.

Returning to FIG. 5, operation 508 next calls blockinput API 130 to determine if the predetermined command has been received from host 106. Decision block 510 then queries whether the predetermined command has been received or, stated otherwise, whether the returned parameter is true. If not (i.e., if the return parameter is false), then process 500 loops back to operation 508. If, however, the predetermined command has been received (i.e., the return parameter is true), then process 500 proceeds to operation 512. Operation 512 then takes down the privacy mode and thereafter may process input received from host 106. In some instances, in response to detecting the predetermined command and before the privacy mode is taken down, program 136 locks host 106 and a login screen is displayed. Therefore, a user that wishes to operate host 106 may first log in before being allowed to control the host.

Stated otherwise, if the return parameter is true at decision block 510, then the calling of API 130 at operation 508 re-blocked the input received from host 106. As such, decision block 510 determines that the predetermined command (unblocking the blocking of the input) was indeed received from host 106. As such, operation 512 proceeds to take down the privacy mode and allow a user of host 106 to regain control of the device, as described in detail immediately below. Until the predetermined command is received, however, process 500 continues to periodically call blockinput API, as illustrated by operations 508 and 510. In response to each call, a parameter of "false" is returned indicating that the predetermined command has not been received from the physical console of host 106. As such, blockinput API 130 continues to block input from host 106 until the predetermined command is received.

Figure 6:
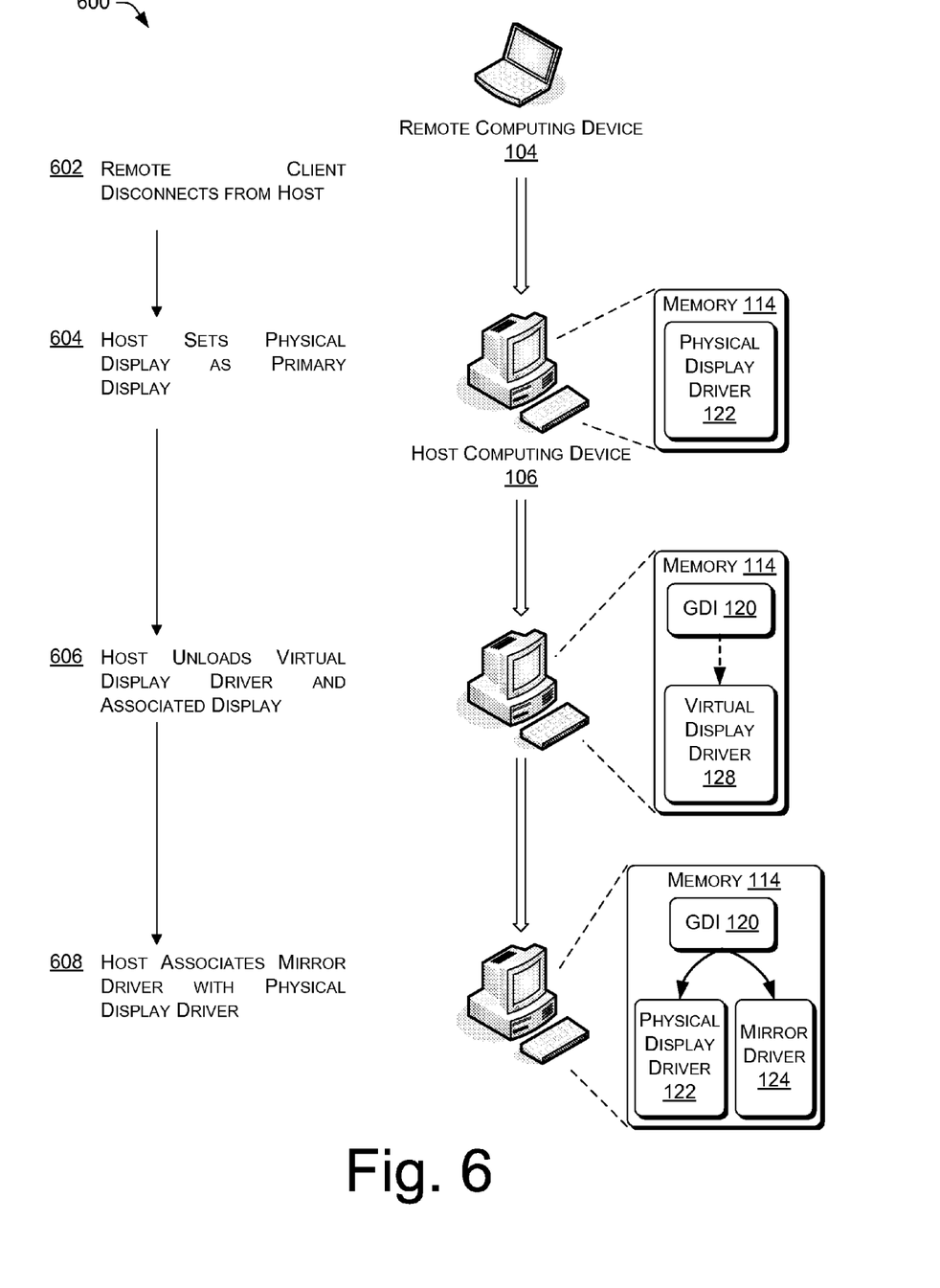
FIG. 6 depicts an illustrative process for restoring a previous configuration of the host after the remote desktop session ceases. Once restored, this previous configuration allows a user at the host computing device to operate and control the host.

FIG. 6 depicts an illustrative process 600 for restoring a previous configuration of host 106 after the remote desktop session ceases. The session may cease after host 106 receives a predetermined command (e.g., a control-alt-delete key sequence), as discussed above with reference to FIG. 5, or after remote client 104 terminates the session. Once restored, the previous configuration of host 106 allows a user at host 106 to operate and control the device.

Process includes operation 602, at which remote client 104 disconnects from host 106 and, hence, terminate the remote desktop session. Next, at operation 604, host 106 sets the physical display as the primary display of the host. At operation 606, host 106 then unloads virtual display driver 128 and the associated virtual display. Finally, host 106 associates mirror driver 124 with physical display driver 122 at operation 608. At this point, host 106 is configured in the same manner as it was prior to the remote client 104 remotely controlling the host. As such, a user of host computing device 106 may now interact with the device and view the interactions on display 110 of host 106.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method of maintaining remote client privacy, the method implemented at least in part on a host computing device, the method comprising:
   associating a virtual display driver with a mirror driver of the host computing device, the mirror driver to provide a representation of a desktop of the host computing device to a remote client;
   disassociating a physical display driver from the mirror driver, wherein the physical display driver is associated with a physical display of the host computing device and the virtual display driver is not associated with the physical display;
   initiating a privacy mode to block input other than a secure attention sequence from being received by the host computing device; and
   in response to receiving the secure attention sequence:
      locking the host computing device,
      displaying a login screen, and
      terminating the privacy mode.

2. A method as recited in claim 1, wherein the mirror driver provides contents of the virtual display driver to the remote client and does not provide contents of the physical display driver to the remote client.

3. A method as recited in claim 1, further comprising:
   receiving input from the remote client;
   altering an application window on the host computing device in response to the receiving of the input;
   transmitting the alteration to the virtual display driver and the mirror driver; and
   transmitting the alteration from the mirror driver to the remote client for rendering on a display of the remote client.

4. A method as recited in claim 1, wherein the virtual display driver is associated with a virtual display, and further comprising loading the virtual display as a primary display of the host computing device such that applications spawn on the virtual display.

5. A method as recited in claim 1, further comprising loading the physical display as a secondary display of the host computing device.

6. A method as recited in claim 1, wherein the virtual display driver is associated with a virtual display, and further comprising altering a location of the physical display or the virtual display such that the physical and virtual displays are approximately diagonal from one another.

7. A method as recited in claim 1, wherein after initiating the privacy mode, the method further comprises further comprising processing input from the remote client while blocking the input received from a physical console of the host computing device.

8. A method as recited in claim 1, wherein terminating the privacy mode comprises further comprising:
   blocking input from a physical console of the host computing device until the host computing device receives a predetermined command; and
   responsive to receiving the predetermined command:
   disassociating the virtual display driver from the mirror driver of the host computing device; and
   loading the physical display as a primary display of the host computing device.

9. A method as recited in claim 8, further comprising processing input received from a physical console of the host computing device responsive to the receiving of the predetermined command.

10. A computing device comprising:
one or more processors; and
a computer-readable storage device including instructions executable by the one or more processors to perform acts comprising:
associating a virtual display driver with a mirror driver of a computing device, the mirror driver to send a representation of a desktop of the computing device to a remote client;
calling an application programming interface (API) to block input received from a physical console of the computing device without blocking input received from the remote client of the computing device; and
periodically calling the API to determine if the API has received a predetermined command secure attention sequence from the physical console; and
responsive to determining that the API has received the predetermined command secure attention sequence from the physical console, processing input received from the physical console.

11. The computing device of claim 10, further comprising:
spawning an application on the virtual display; and
using the mirror driver to provide a remote representation of the spawned application to a remote client.

12. The computing device of claim 10, further comprising detaching the physical display before loading the physical display as the secondary display.

13. The computing device of claim 10, wherein the virtual display is associated with the virtual display driver and the physical display is associated with a physical display driver, and further comprising providing contents of the virtual display driver to remote client, without providing contents of the physical display driver to the remote client.

14. The computing device of claim 10, further comprising spawning an application on the physical display, the application indicating that the remote client is controlling the computing device.

15. A method of maintaining remote client privacy, the method comprising:
associating a virtual display driver with a minor driver of a computing device, the mirror driver to send a representation of a desktop of the computing device to a remote client;
calling an application programming interface (API) to block input received from a physical console of the computing device without blocking input received from the remote client of the computing device;
periodically calling the API to determine if the API has received a predetermined command secure attention sequence from the physical console; and
responsive to determining that the API has received the predetermined command secure attention sequence from the physical console, processing input received from the physical console.

16. A method as recited in claim 15, wherein the API blocks mouse inputs and keystrokes received at the physical console of the computing device.

17. A method as recited in claim 15, wherein the predetermined command secure attention sequence comprises a predetermined key sequence initiated at a keyboard of the physical console of the computing device.

18. A method as recited in claim 15, further comprising sending the representation of the desktop of the computing device to the remote client by the mirror driver without displaying the desktop on a physical display associated with the computing device.

19. A method as recited in claim 15, further comprising ending a remote desktop session of a remote client responsive to determining that the API has received the predetermined command from the physical console.

* * * * *